United States Patent [19]
Wieland

[11] 3,890,303
[45] June 17, 1975

[54] PROCESS FOR THE INTRODUCTION OF FLUORINE INTO THE 21-POSITION OF 20-OXO-STEROIDS

[75] Inventor: Peter Wieland, Oberwil, Switzerland

[73] Assignee: Ciba-Geigy Corporation, Ardsley, N.Y.

[22] Filed: Feb. 15, 1974

[21] Appl. No.: 443,054

[30] Foreign Application Priority Data
Feb. 28, 1973 Switzerland.......................... 2951/73

[52] U.S. Cl........................................ 260/239.55 D
[51] Int. Cl........................................... C07c 169/30
[58] Field of Search..... Machine Searched Steroids; 260/239.55 D

*Primary Examiner*—Elbert L. Roberts
*Attorney, Agent, or Firm*—Joseph G. Kolodny; John J. Maitner; Theodore O. Groeger

[57] ABSTRACT

A process for 21-fluorination of 20-oxo-steroids, wherein a steroid of the partial formula

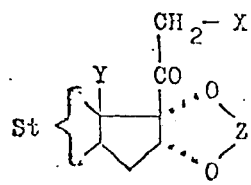

wherein X represents a reactive esterified hydroxyl group that is different from the fluorine atom, Y represents a hydrogen atom or a lower aliphatic radical, Z represents a geminal hydrocarbon radical of aliphatic character, and St represents the optionally substituted residual part of the steroid skeleton, is treated with an agent containing radical-anions, such as lithium-biphenyl, and with perchloryl fluoride, affords final products free of difluorinated side-products.

19 Claims, No Drawings

PROCESS FOR THE INTRODUCTION OF FLUORINE INTO THE 21-POSITION OF 20-OXO-STEROIDS

The present invention provides a process for the introduction of fluorine into the 21-position of 20-oxo-steroids with elimination of a reactive esterified hydroxyl group in the 21-position that differs from the fluorine atom.

A number of such processes are already known. For example, it is possible to treat a 20-oxo-21-iodo-pregnane compound with silver fluoride or to treat a 20-oxo-21-mesyloxy-pregnane compound with potassium fluoride in acetonitrile at boiling heat. According to another related method, but wherein a start is made from 21-substituted 20-oxo-pregnane compounds of another kind, the desired introduction of the fluorine atom in 21-position is effected by reacting a 20-oxo-pregnane compound that contains in 21-position a formyl or esterified oxalyl group with perchloryl fluoride. An alkali metal enolate that is formed by treating a 21-unsubstituted 20-oxo-pregnane compound with an alkali metal amide, for example lithium diisopropylamide, in an aprotic solvent can also be reacted with perchloryl fluoride. In general, these methods provide the desired 21-fluoro end-product, only in modest yield. The removal of the 21-disubstituted by-product, which frequently occurs simultaneously, and of the starting material, is always exceedingly difficult and often does not succeed at all.

The process according to the invention provides a general method that virtually eliminates the above mentioned disadvantages of the known methods and follows a smooth reaction course that can be easily kept under control. The process according to the invention consists in treating a compound of the partial formula

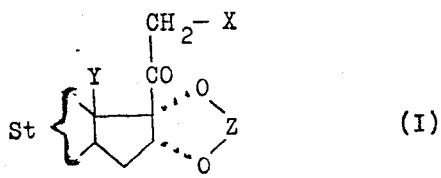

wherein X represents a reactive esterified hydroxyl group that is different from the fluorine atom, Y represents hydrogen or a lower aliphatic radical and Z represents a divalent hydrocarbon radical of aliphatic character at a carbon atom, and St represents the optionally substituted residual part of the steroid skeleton, successively with an agent that contains radical anions and with perchloryl fluoride in an aprotic solvent.

A reactive esterified hydroxyl group is herein e.g. a hydroxyl group that is esterified with a strong inorganic or organic acid. Examples of suitable strong inorganic acids are phosphoric acids, sulphur acids, and, in particular, hydrohalic acids, e.g. hydrochloric, hydrobromic, or hydriodic acid. Hydrofluoric acid is naturally ruled out since its ester constitutes the functional group to be introduced. Examples of strong organic acids are sulphonic acids, especially monocyclic aromatic sulphonic acids, such as benzenesulphonic acid, p-bromobenzenesulphonic acid or p-toluenesulphonic acid, or also lower alkanesulphonic acids, primarily methanesulphonic acid.

The lower aliphatic radical Y is in particular a straight alkyl or alkenyl radical of not more than four carbon atoms, e.g. the ethyl, propyl, n-butyl, vinyl or allyl radical, but chiefly the methyl radical.

The geminal hydrocarbon radical of aliphatic character Z is one in which at least the carbon atom that is attached to the oxygen atoms in 16- and 17-position does not carry double bond. The radical Z is therefore an aliphatic, a cycloaliphatic, cycloaliphatic-aliphatic or an araliphatic radical that can also be substituted by acetalised or ketalised oxo groups or free or etherified hydroxyl groups and can contain isolated double bonds; but preferably the radical is unsubstituted. An aliphatic radical of the above definition is in particular an alkylidene radical of at most 11 carbon atoms, e.g. the methylene, ethylidene, 1-propylidene, 1- or 2-butylidene, 3-pentylidene, 4-heptylidene, 5-nonylidene, 6-undecylidene, but, above all, the 2-propylidene radical. A cycloaliphatic radical of the above definition is in particular a monocyclic cycloalkylidene radical of five to 11 carbon atoms that can be substituted by one or more lower alkyl radicals, for example those mentioned hereinbefore, e.g. the cyclopentylidene, 1- or 2-methylcyclopentylidene, 2,5- or 3,4-dimethylcyclopentylidene, cyclohexylidene, 2-, 3- or 4-methylcyclohexylidene, 2,4,6-trimethylcyclohexylidene, or cycloheptylidene radical. Possible cycloaliphatic-aliphatic and araliphatic radicals of the above definition are in particular those that carry one or two monocyclic cycloalkyl radicals, e.g. those corresponding to the cycloalkylidene radicals cited hereinabove, or one or two phenyl radicals, at an alkylidene radical of not more than five carbon atoms, for example one of these cited hereinabove.

The residual part of the steroid skeleton St consists of the rings A, B, and (partly) C, which can be in any desired steric configuration, e.g. in that of the 5α, 9β, 10α-, 5β, 9β, 10α- or 5α, 9β, 10α-gonane, and, above all, of the 5α, 9α, 10β- or 5β, 9α, 10β-gonane, or of the A-nor or B-nor and/or A-homo or B-homo analogue thereof, and in 10-position can carry an angular methyl group. The radical St can also carry one or more double bonds, for example in the 1,2- or 9,11-positions and especially in the 5,6- or 4,5- and/or 6,7-positions, and can be in the form of a 3,5-cyclosteroid and/or be substituted by one or more ketalised oxo groups and/or free or etherified hydroxyl groups at the steroid skeleton or at the methyl group in 10-position, in particular in the 3- and/or 19-positions. The ketalised oxo groups are in particular those that, as alcohol component, have lower alkanols, chiefly methanol or ethanol, or, preferably, lower aliphatic α- or β-glycols, primarily ehtylene glycol. The etherified hydroxyl group is preferably the tetrahydropyranyl-2-oxy group. The starting materials can be in the form of racemates, obtainable by total synthesis, or, above all, as individual antipodes of the natural D-series.

The reagent described as an agent that contains radical-anions is the reaction product that is obtained by treating a polycyclic aromatic hydrocarbon with an alkali metal, e.g. sodium, potassium, or, especially, lithium, in the absence of a proton donor.

The polycyclic aromatic hydrocarbon is, for example, naphthalene or one of the methyl or dimethyl homologue thereof, or anthracene, phenanthrene, terphenyl, or, above all, biphenyl. The hydrocarbon and the alkali metal are in the molar ratio of about 1:1. A particular preferred reagent for the process according to the invention is lithium-biphenyl.

As an aprotic solvent that can be used as reaction medium not only for the process according to the invention, but also for the formation of the agent containing radical-anions, there are used preferably saturated open-chain or cyclic ethers or polyethers and their mixtures with one another or with another aprotic solvent. Suitable ethers are: symmetrical di-lower alkyl ethers, e.g. dimethyl ethers, diethyl ether, dipropyl ether, diisopropyl ether, dibutyl ether or diisobutyl ether; polyethers derived from glycols, e.g. ethylene glycol dimethyl or diethyl ether, 1,2- or 1,3-propylene glycol dimethyl or diethyl ether, diethylene glycol dimethyl ether or triethylene glycol dimethyl ether; acetals, e.g. acetaldehyde dimethyl or diethyl acetal; tetrahydrofuran; tetrahydropyran; dioxan or tetrahydrofuryl methyl ether. Tetrahydrofuran is particularly advantageous. As other aprotic solvents or diluents it is also possible to add e.g. aliphatic or aromatic inert hydrocarbons, such as hexane, benzene, toluene, or hydroaromatic hydrocarbons, such as polyhydronaphthalene.

The chemical principle of the reaction consists in converting the starting material of the partial formula I, the group X defined hereinbefore being split off by reduction in the process, into a 20(21)-enolate of the partial formula

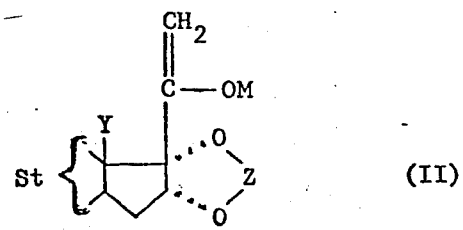

wherein St, Y, and Z have the meanings as indicated hereinbefore and M represents the alkali metal defined hereinbefore, in particular lithium, by treatment with 2 molar equivalents of the agent containing radical-anions.

The resulting enolate is then converted by reaction with one molar equivalent of perchloryl fluoride to the desired end product of the partial formula

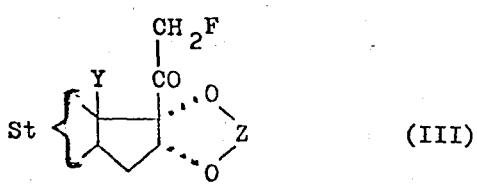

wherein St, Y, and Z have the meanings given hereinbefore.

The character of the above conversions allows the entire process, including the preparation of the reagent containing radical-anions, to be carried out advantageously in the same reaction mixture without isolation of the intermediate products and without detriment to the yields. However, since each of the reactions proceeds best in another temperature range, it is advisable to guide the reactions, by heating or cooling, into the advantageous temperature ranges during the process.

The preliminary step of the process, i.e., the reaction of the alkali metal with the polycyclic aromatic hydrocarbon, ordinarily proceeds at room temperature. If desirable or necessary, it can also be speeded up by warming gently or, if it proceeds too energetically, slowed down by cooling. The steroid component is treated with the reagent that contains radical-anions at temperatures between about 0°C and about −100°C. On account of the possible occurrence of undesirable secondary reactions, it is advisable to employ lower temperatures, for example −40°C to −80°C, especially −60°C to −75°C. The reaction with perchloryl fluoride takes place within a wide temperature range from about −100°C to about +30°C. It is advantageous to allow the temperature to rise gradually during the reaction throughout the entire temperature range, for example from −75°C to room temperature.

The process according to the invention can be carried out, for example, in the following manner. The agent that contains radical-anions is prepared by treating the appropriate aromatic component, of which ordinarily a surplus is used, in known manner with the alkali metal in one of the above mentioned aprotic solvents (N.B. this preparation is not an object of the present invention). This is best accomplished by stirring the mixture at room temperature, advantageously in an inert atmosphere, e.g. of argon or nitrogen. The metal can be used in the form of wire or can be cut into small pieces, or it can also be used in finely divided form. After the metal has dissolved, the required reagent is supplied and it is possible to carry out the actual process according to the invention in the same reaction mixture, advantageously with a surplus of the reagents. This is expediently accomplished by adding the steroid component to the reaction mixture at an appropriate temperature, for example that recommended hereinbefore, and allowing the reactants to react thoroughly under the same reaction conditions. The inert atmosphere is then gradually expelled with perchloryl fluoride, care being taken to keep the initially energetic exothermic reaction under control, especially with respect to the temperature range recommended hereinbefore, by a suitable combination of cooling, stirring, and rate of addition of perchloryl fluoride. Towards the conclusion of the reaction, it is expedient to thoroughly mix the gaseous reagent with the liquid phase and thereby to accelerate the slackening reaction.

The 21-fluoro-20-oxosteroids which occur as end products are pharmacologically important compounds with hormonal activity, e.g. with progestational, antiovulatory and/or antiinflammatory activity, or they can be used as intermediates for the manufacture of such compounds. Particularly important compounds manufactured according to the invention are those of the formula

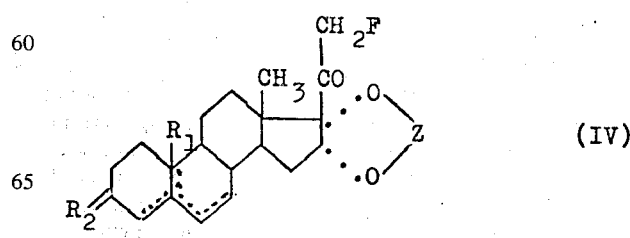

wherein Z has the general or preferred meanings given hereinbefore, $R_1$ represents a hydrogen atom or a methyl group that is optionally substituted by $R_2$, and $R_2$ represents a ketalised oxo group, especially one of the significance given hereinbefore, primarily an ethylenedioxy group, or represents hydrogen together with a free or etherified hydroxyl group in the α- or, in particular, β-position, and the dotted bonds represent a double bond in 4,5- or 5,6-position, or also in 5,10-position (in which case $R_1$ has no function), or represent two double bonds in the 4,5;6,7-positions.

The starting materials are known or, if they are new, can be obtained in a manner known per se. It is advantageous to use those starting materials that contain the substituents particularly mentioned hereinabove, and especially those that lead to the final products specifically described herein or highlighted e.g. by formula IV.

The invention also relates to those embodiments of the process in which the process is discontinued at any stage and the intermediate is used in another way, or in which a starting material is formed under the reaction conditions.

The following Example describes the invention in more detail but without thereby limiting it.

EXAMPLE

With stirring and in a current of nitrogen, 264 mg of lithium are added to a solution of 5.28 g of biphenyl in 88 ml of absolute tetrahydrofuran. Four hours later the mixture is cooled to −70°C, and a solution of 2.2 g 3,3-ethylenedioxy-16α, 17α-isopropylidenedioxy-20-oxo-21-mesyloxy-5-pregnene in 60 ml of tetrahydrofuran is added and rinsed with 18 ml of tetrahydrofuran. After 10 minutes the nitrogen is replaced at −70°C by introducing perchloryl fluoride at an internal temperature of −34°C. Half an hour later the cooling is removed and stirring is then continued for 1 hour. The perchloryl fluoride is driven off with nitrogen and the reaction mixture is treated with sodium hydrogen carbonate solution and extracted repeatedly with toluene. The organic solutions are washed with water, dried, and evaporated in vacuo. The residue is taken up in 200 ml of petroleum ether and the solution is filtered through 66 g of aluminium oxide (activity II) while rinsing with 2 litres of petroleum ether. The 3,3-ethylenedioxy-16α, 17α-isopropylidenedioxy-20-oxo-21-fluoro-5-pregnene is subsequently eluted from the column with toluene. Crystallisation from methanol containing pyridine yields 1.44 g, which are identical with an authentic reference preparation. After crystallisation from methylene chloride/ether, the 3,3-ethylenedioxy-16α, 17α-isopropylidenedioxy-20-oxo-21-fluoro-5-pregnene melts at 189°–192°C.

I claim:

1. A process for the introduction of fluorine into the 21-position of 20-oxo-steroids, accompanied by the elimination of a reactive esterified hydroxyl group in the 21-position, wherein a compound of the partial formula

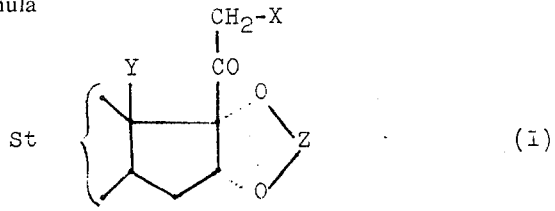

wherein X represents an hydroxyl group esterified with an organic sulphonic acid or a hydrohalic acid excepting hydrofluoric acid, Y represents a hydrogen atom or a lower aliphatic radical and Z represents a cycloalkylidene radical that contains five to 11 carbon atoms or an alkylidene radical that contains not more than 11 carbon atoms, and if it contains not more than five carbon atoms, can also carry one or two cycloalkyl radicals or phenyl radicals; and St represents the optionally substituted residual part of the steroid skeleton, is treated successively with an agent which is the reaction product of the action of an alkali metal on a polycyclic aromatic hydrocarbon and with perchloryl fluoride in an aprotic solvent.

2. A process according to claim 1, wherein the reaction product of the action of alkali metals on polycyclic hydrocarbons in an aprotic solvent is used as agent that contains radical-anions.

3. A process according to claim 2, wherein biphenyl is used as polycyclic aromatic hydrocarbon.

4. A process according to claim 2, wherein lithium is used as alkali metal.

5. A process according to claim 1, wherein the reaction with the reagent that contains radical-anions is carried out at temperatures in the range between −100°C and 0°C.

6. A process according to claim 5, wherein the process is carried out in the temperature range between −40°C and −80°C.

7. A process according to claim 6, wherein the process is carried out in the temperature range between −60°C and −75°C.

8. A process according to claim 5, wherein the process is carried out in an inert atmosphere.

9. A process according to claim 8, wherein the process is carried out in an atmosphere of nitrogen.

10. A process according to claim 1, wherein the process is carried out with a surplus of perchloryl fluoride.

11. A process according to claim 1, wherein the treatment with perchloryl fluoride is carried out in the temperature range between −100°C and +30°C.

12. A process according to claim 1, wherein an open-chain or cyclic ether is used as aprotic solvent.

13. A process according to claim 12, wherein tetrahydrofuran is used as solvent.

14. A process according to claim 1, wherein the entire process, including the preparation of the reagent that contains radical-anions, is carried out in the same reaction mixture without isolation of the intermediate products.

15. A process according to claim 1, wherein a start is made from a compound of the formula I, in which X represents chlorine, bromine, or iodine.

16. A process according to claim 1, wherein a start is made from a compound of the formula I, in which X represents a hydroxyl group that is esterified by a monocyclic aromatic sulphonic acid or by a lower alkanesulphonic acid.

17. A process according to claim 16, wherein the hydroxyl group that is esterified by a lower alkanesulphonic acid is the methanesulphonyloxy group.

18. A process according to claim 1, wherein a start is made from compounds of the formula I, in which Y represents an alkyl or alkenyl radical with not more than four carbon atoms, Z represents a cycloalkylidene radical that contains five to 11 carbon atoms or an alkylidene radical that contains not more than 11 carbon atoms, and, if it contains not more than five carbon atoms, can also carry one or two cycloalkyl radicals or phenyl radicals, and St represents a residual part of the 9α, 10β- or 9β, 10α-gonane that can carry an angular methyl group in 10-position and/or one or more double bonds and/or can be substituted at the skeleton or at the angular methyl group by one or more ketalised oxo groups and/or free or etherified hydroxyl groups.

19. A process for the manufacture of compounds of the partial formula

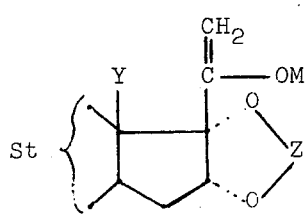 (II)

wherein M represents an alkali metal, Y represents a hydrogen atom or a lower aliphatic radical and Z represents a cycloalkylidene radical that contains five to 11 carbon atoms or an alkylidene radical that contains not more than 11 carbon atoms, and if it contains not more than five carbon atoms, can also carry one or two cycloalkyl radicals or phenyl radicals, and St represents the optionally substituted residual part of the steroid skeleton, wherein a compound of the partial formula

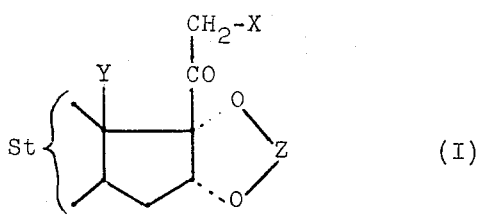 (I)

in which X represents an hydroxyl group esterified with an organic sulphonic acid or a hydrohalic acid excepting hydrofluoric acid, and Y, Z, and St have the meanings given hereinbefore, is treated with an agent which is the reaction product of the action of an alkali metal on a polycyclic aromatic hydrocarbon in an aprotic solvent.

* * * * *